UNITED STATES PATENT OFFICE.

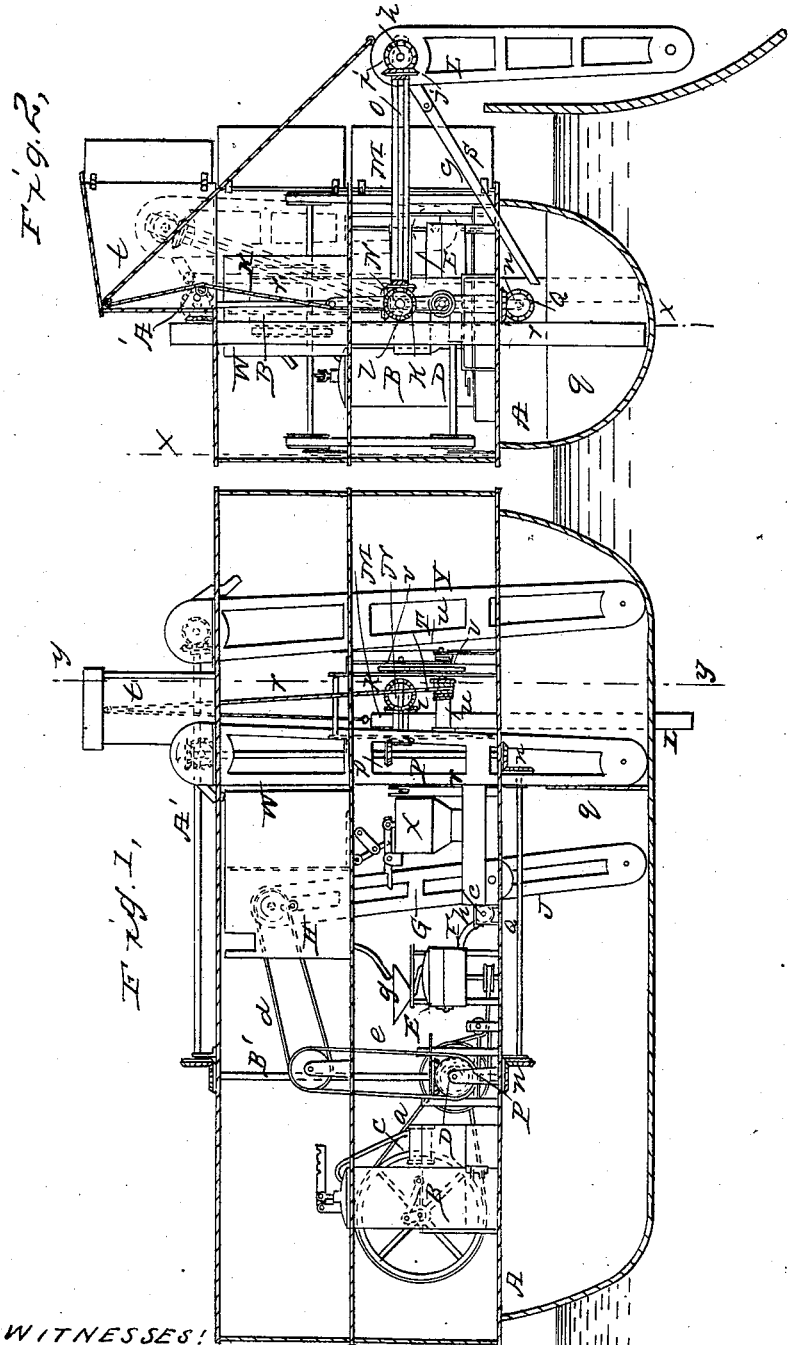

JAMES A. DORMAN, OF NEW YORK, N. Y.

IMPROVEMENT IN FLOATING MILLS.

Specification forming part of Letters Patent No. 42,756, dated May 17, 1864.

*To all whom it may concern:*

Be it known that I, JAMES A. DORMAN, of the city, county, and State of New York, have invented a new and Improved Floating Mill; and I do hereby declare that the following is a full, clear, and exact description of the same, reference being had to the accompanying drawings, making a part of this specification, in which—

Figure 1 is a longitudinal vertical section of my invention, taken in the line $x\ x$, Fig. 2; Fig. 2, a transverse vertical section of the same, taken in the line $y\ y$, Fig. 1.

Similar letters of reference indicate corresponding parts in the two figures.

This invention relates to a new and useful combination of one or more grinding-mills, elevators, and a weighing device, all arranged on a barge or vessel in such a manner that a vessel loaded with grain may, when placed by the side of the floating mill, be unloaded and the grain discharged into the former, weighed, and then ground into flour or meal, all the work being performed with the greatest facility, and with but trifling labor.

This invention is designed to supersede the stationary steam grinding-mills in the suburbs of large cities by economizing in rent, and also in the unloading of vessels containing the grain, as well as dispensing with much cartage, which is a great item of expense.

To enable those skilled in the art to fully understand and construct my invention, I will proceed to describe it.

A represents a barge or vessel of any proper construction, which is inclosed above its deck or has a structure built upon it of two or more stories, two stories being represented in the drawings.

B represents a steam-boiler, and C a steam-engine, by which the machinery is driven.

D is a line of shafting, from which motion is communicated to the various working parts.

E represents a grinding-mill, such as is generally termed a "portable" mill for grinding grain. This mill is firmly secured to the deck of the barge or vessel A, and it is driven by a belt, $a$, from the shaft D. The flour or meal from this portable mill E is discharged through a spout, F, into a horizontal trough, $b$, containing spiral conveyers $c$, which convey the flour or meal to a set of elevators, G, the latter carrying the flour or meal upward and discharging it into a box, H, in the upper story, from which it is taken and packed or bagged. The elevators G, which are constructed in the usual way, are driven by a belt, $d$, from a line of shafting, I, in the upper story of the structure, the shafting I being driven by a belt, $e$, from the shafting D in the story below, as shown in Fig. 1.

J is a set of elevators which extend from the hold of the barge or vessel. These elevators are also driven by a belt from the shafting I, and they elevate the grain from the hold of the vessel and carry it up into a box, K, in the upper story of the structure, from which box it is discharged through a spout, $f$, into the hopper $g$ of the mill E. (See Fig. 1.)

From the above description it will be seen that the grain is taken up from the hold of the barge or vessel and discharged into a box, K, from which it falls into the hopper $g$ of the mill E, and is ground, and the flour or meal, as before stated, then passes into the trough $b$, and is conveyed to the elevators G and carried up into box H. These parts just described comprise the grinding apparatus. The other part of the invention, which relates to a discharging and loading device, and also to a weighing device, I will now proceed to describe.

L represents a set of elevators which are hung in a frame, M. This frame is of rectangular form, and it is fitted at its inner end on a shaft, N, on which it is allowed to work or turn freely. The upper ends of the elevators L are fitted on a shaft, $h$, in the outer end of the frame M, and this shaft $h$ has a bevel-wheel, $i$, upon it, into which a bevel-wheel, $j$, on a shaft, O, gears, the shaft O being in the frame M, and having at its lower end a bevel-wheel, $k$, upon it, which gears into a similar wheel, $l$, on the shaft N. By this arrangement it will be seen that the elevators L are operated by means of the gearing and shafting described, while at the same time the frame M will admit of the elevators L being lowered into the hold of a vessel for the purpose of discharging the grain therefrom, and the elevators may be adjusted higher or lower or in a vertical or a more or less inclined position, as may be required, without affecting the elevator-driving mechanism. The shaft N receives its motion from a vertical shaft, P, in the barge or vessel, motion being communicated from P to N through the medium of gears $p$, and the vertical shaft P receives its motion from the line of shafting D through the medium of a horizontal shaft, Q, which is below the deck of the barge or vessel, and is connected by gears $n$ with a vertical shaft, P′, the upper end of which is connected by gears $o$ with the line of shafting D, the shaft Q being connected with the lower end of the vertical shaft P by means of gears $n'$. The elevators L have a spout, S, attached to them, which spout conveys the grain from the elevators into the hold of the barge or vessel A, a partition, $q$, dividing this part of the hold from that in which the elevators J work. (See Fig. 1.) By this arrangement it will be seen that a vessel loaded with grain may be placed by the side of the barge or vessel containing the mill and the cargo of the former discharged into the hold of the latter with the greatest facility and at a comparatively trifling expense, for all cartage is avoided. The elevators L are raised and lowered and adjusted in proper position by means of a windlass, T, the rope or chain $r$ of which passes through an eye or pulley, $s$, in a hood or chamber, $t$, at the top of the structure on the barge or vessel, as shown clearly in Fig. 2. The drum $u$ of the windlass is rotated through the medium of friction-wheels $v\ v$ from the shaft N, the windlass T being raised and lowered by means of a lever, U.

V is a set of elevators which raise or take up the grain from the part of the hold into which it is discharged by the elevators L, and convey it into a box. W, from which it is discharged into a weighing device, X, and drops from thence into the portion of the hold in which the lower part of the elevators J work. By this arrangement it will be seen that the grain is all weighed before being carried up to be ground.

V is a set of elevators the lower part of which work in the compartment of the hold into which the grain is discharged from the elevators L. These elevators are only used when grain is to be bagged, and are not strictly essential. They are driven or operated by a shaft, Z, on the top of the structure, said shaft receiving its motion from a vertical shaft, A′, which is operated from the line of shafting D by a vertical shaft, B′. The several boxes H K W are all formed by partitions within a large box in the second story of the structure, said partitions being shown by dotted lines in both figures.

I would remark that the elevators may be constructed in the usual way—to wit, buckets attached to endless straps and inclosed within suitable trunks or boxes. The weighing device may also be constructed in any of the known ways, and the same may be said of the grinding-mill, one or more of which may be used.

I would further remark that this invention has recently been put in operation and proves to be a decided success, a great saving being effected in the grinding of grain.

Having thus described my invention, what I claim as new, and desire to secure by Letters Patent, is—

1. The combination of one or more grinding mills, E, elevators G J, and weighing device X, all constructed as specified, and arranged on a barge or vessel, A, to form a floating mill, as herein set forth.

2. In combination with the above, the discharging-elevators L, placed within a swinging or adjustable frame, M, and arranged with a windlass, T, to operate in the manner substantially as herein set forth.

Witnesses:     JAMES A. DORMAN.
  M. M. LIVINGSTON,
  ALEX. F. ROBERTS.